United States Patent [19]

Ishikawa et al.

[11] Patent Number: 4,726,980

[45] Date of Patent: Feb. 23, 1988

[54] ELECTROMAGNETIC WAVE ABSORBERS OF SILICON CARBIDE FIBERS

[75] Inventors: Toshikatsu Ishikawa; Haruo Teranishi, both of Tokyo; Hiroshi Ichikawa; Kenji Ushikoshi, both of Yokohama, all of Japan

[73] Assignee: Nippon Carbon Co., Ltd., Tokyo, Japan

[21] Appl. No.: 22,945

[22] Filed: Mar. 6, 1987

[30] Foreign Application Priority Data

Mar. 18, 1986 [JP] Japan .................................. 61-58413

[51] Int. Cl.$^4$ ................................................ B32B 7/00

[52] U.S. Cl. .................................... 428/212; 428/236; 428/246; 428/259; 428/284; 428/367

[58] Field of Search ............... 428/212, 236, 246, 284, 428/367, 259

[56] References Cited

U.S. PATENT DOCUMENTS 4,507,354 3/1985 Ishikawa et al. .................... 428/367

*Primary Examiner*—Marion C. McCamish

*Attorney, Agent, or Firm*—Bucknam and Archer

[57] ABSTRACT

An electromagnetic wave absorber comprising a surface layer made of a composite of fibers having an electrical specific resistance of more than $10^4$ Ωcm and a resin, and a wave absorbing layer made of a composite containing silicon carbide fibers having an electrical specific resistance of from $10^{-2}$ to $10^4$ Ωcm. The composite used in the surface layer may be prepared, for example, by impregnating the resin in between the fibers after they have been treated to be a woven cloth, mat or felt or unidirectionally arranged fibers. If a wave absorbing layer is to be made of a composite containing the silicon carbide fibers and a resin, then the composite may be prepared in the same way as above.

15 Claims, 6 Drawing Figures

ELECTROMAGNETIC WAVE ABSORBERS OF SILICON CARBIDE FIBERS

BACKGROUND OF THE INVENTION

1. Field of the Invention

This invention relates to electromagnetic wave absorbers and more particularly to multi-layer type electromagnetic wave absorbers which comprise a surface layer made of a composite of fibers having high electrical specific resistance and a resin as well as a wave absorbing layer made of a composite containing silicon carbide fibers having low electrical specific resistance whereby the absorbers can be lightweight and excellent in attenuation ability, broad-band wave absorbability and weatherproofness and they can also be excellent in physical properties such as mechanical strength.

2. Prior Art

It has heretofore been well known that multi-layer type wave absorbers prepared by laminating various composites have broad-band wave absorbability. In conventional multi-layer type wave absorbers, the materials composing the surface layer are different from those composite of glass fibers or Kevlar fibers and a resin incorporated with ferrite or carbon powder as material for the wave absorbing layer.

However, a conventional wave absorbing layer made of the above materials is disadvantageous in that it causes the resulting wave absorber to have low strength as a whole due to its low strength. In addition, a conventional wave absorbing layer made of the ferrite-containing resin is disadvantageous in that it causes the resulting wave absorber to be heavy in weight due to the high specific gravity of said resin. Further, when a wave absorber is constructed from surface and wave absorbing layers whose respective materials are different from each other, it will be not only low in strength but also early degradable as a structure due to the differences in thermal expansion, mechanical properties and the like between the surface and wave absorbing layers.

OBJECTS AND SUMMARY OF THE INVENTION

It is therefore an object of this invention to provide an electromagnetic wave absorber which has eliminated the above-mentioned drawbacks.

It is another object of this invention to provide an electromagnetic wave absorber which is not only light in weight and excellent in attenuation ability, broad-band wave absorbability and weather resistance, but also excellent in physical properties such as mechanical strength.

Further objects and advantages of this invention will be apparent from the following description.

The present inventors made intensive studies in an attempt to attain the above-mentioned objects and, as a result of their studies, they noticed the fact that fibers having high electrical specific resistance, especially silicon carbide (SiC) fibers having high electrical specific resistance, have, per se, various good properties such as lightweight, high strength, high flexibility, excellent weather resistance and the fact that SiC fibers having low electrical specific resistance have excellent wave absorbability in spite of their somewhat inferior physical properties as compared with those of the former, after which they found that the objects may be attained by using as a surface layer material a composite containing fibers having high electrical specific resistance and using as a wave absorbing layer material a composite containing SiC fibers having low electrical specific resistance. This invention is based on this finding or discovery.

More particularly, the electromagnetic wave absorber of this invention comprises (1) a surface layer made of a composite containing fibers having an electrical specific resistance of more than $10^4$ Ωcm, preferably more than $10^6$ Ωcm, and a resin, and (II) a wave absorbing layer made of a composite containing silicon carbide fibers having an electrical specific resistance of $10^{-2}$ to $10^4$ Ωcm.

DESCRIPTION OF THE PREFERRED EMBODIMENTS OF THE INVENTION

Figure 1:
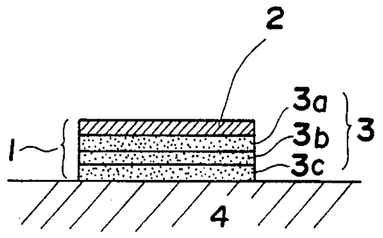
FIG. 1 is a sectional view of a wave absorber of this invention applied to a reflecting body.

The material used for the surface layer of the wave absorber of this invention is a composite made of fibers having an electrical specific resistance of more than $10^4$ Ωcm, preferably more than $10^6$ Ωcm and a resin. The surface layer is used mainly in order to strengthen the resulting wave absorber and is not a layer for absorbing electromagnetic waves. Thus, the surface layer is permeable to electromagnetic waves thereby to allow almost all thereof to penetrate therethrough when the resulting wave absorber is used. The reason why the fibers used in the surface layer are required to have an electrical specific resistance of more than $10^4$ Ωcm is as follows:

In general, the lower the electrical specific resistance of the fibers is, the more the electromagnetic permeability thereof decreases and the more the electromagnetic wave reflectivity thereof increases. Thus, the fibers having an electrical specific resistance of $10^4$ Ωcm or below are not practically used as material for the surface layer since an increase in electromagnetic wave reflectivity of the fibers causes the resulting wave absorber to decrease in performance (wave attentuation) as a wave absorber.

The fibers used as material for the surface layer may include various inorganic fibers or organic fibers, among which SiC fibers are most preferable in view of their properties such as lightweight, high strength, flexibility and weatherproofness.

The composite of fibers and a resin, which is used as material for the surface layer, may be prepared by impregnating a synthetic resin into woven cloths, mats or felts or into between the fibers of unidirectionally arranged fibers in a bundle form to bond the cloths, mats, felts or the fibers of the bundle to each other; or the composite may also be prepared by sandwiching fibers, which are woven into cloth, in between a resin. The preferable resins used in the preparation of the composites include thermosetting resins such as epoxy type and phenol type resins, and thermoplastic resins such as polyester, polyphenylene sulfide (PPS), nylon, polyether sulfone (PES) and polyether ether ketone (PEEK). Instead of the resins, ceramics such as alumina-silica, SiN, SiC and Sialon may be used. In addition, the fibers/resin composites referred to herein include prepreg sheets. The higher the specific strength (strength/specific gravity) of strengthened fibers used in these composites is, the more desirable the composites are since the surface layer is laminated with the wave absorbing layer in order to improve the resulting wave absorber in strength and to allow electromagnetic waves to be absorbed in the absorbing layer without being reflected by the surface layer.

As material for the absorbing layer used in the wave absorber of this invention, there is employed a composite containing SiC fibers having an electrical specific resistance of $10^{-2}$ to $10^4$ Ωcm, preferably $10^{-2}$ to $10^2$ Ωcm. If there are used SiC fibers having an electrical specific resistance which is outside the range of $10^{-2}$ to $10^4$ Ωcm, the resulting wave absorber will not have excellent wave absorbability. The SiC fibers used herein are preferably those which are prepared from an organic silicon compound. The electrical specific resistance, dielectric constant and dielectric loss of the SiC fibers may be readily adjusted by varying heat treating conditions in an inert atmosphere when SiC filaments for preparing the SiC fibers therefrom are prepared.

In cases where a wave absorbing layer is to be made of a composite of SiC fibers and a resin, the kind of resin used and a method for the preparation of said layer are the same as in the above-mentioned surface layer. In addition, a resin to be used in the production of the surface layer and that in the production of the wave absorbing layer may be identical with or different from each other. To enable the resulting wave absorber to have higher strength, it is preferable to use the same kinds of materials in the preparation of the surface and wave absorbing layers of the absorber so that these two layers are approximate to each other in thermal expansion and mechanical properties.

In cases where a wave absorbing layer is to be made of a composite of SiC fibers and other fibers, it is preferable that the composite be a woven cloth or mat composed of SiC fibers and carbon fibers (hereinafter referred to as SiC fiber/carbon fiber mixed textile) in a mixing ratio of SiC fibers to carbon fibers ranging from 20:1 to 60:40, by weight, and the composite has an electrical specific resistance of $10^{-2}$ to $10^4$ Ωcm.

To further improve the wave absorbing layer in wave absorbability, the layer may be a multi-laminated body which is prepared by laminating composites containing SiC fibers having different electrical specific resistances. In this case, it is preferable that the composites be laminated in such a manner that the electrical specific resistances of the SiC fibers or the SiC fiber/carbon fiber mixed textile in the composites making up said laminated body are decreasingly gradient from the surface of the laminated body towards the surface of a reflecting body that is an object to which the wave absorber is applied. The reflecting body referred to herein is intended to mean one which is made of a metal or a conductive material equivalent to a metal and which reflects electromagnetic waves.

In cases where it is necessary to further increase the wave absorbing layer in wave absorbability by improving it in dielectric constant and dielectric loss, a resin incorporated with inorganic material is preferably used as the resin used in the production of the composite of the wave absorbing layer. The inorganic materials used in this invention include carbon, titanium oxide ($TiO_2$) and barium titanate ($BaTiO_2$). The carbon includes carbon powder, graphite powder, or carbon or graphite fibers in a chopped form. These inorganic materials are preferably contained in an amount of 0.1 to 50.0% by weight in the resin. If they are contained in an amount outside of the range of 0.1 to 50.0% by weight, the resulting wave absorbing layer will not have proper dielectric constant and dielectric loss.

In the wave absorber of this invention composed of the surface layer and wave absorbing layer, a reflecting layer may be further laminated on the side of the wave absorbing layer. The reflecting layer may be a composite made of carbon fibers, a resin and/or a thin metal plate or film. The reflecting layer is a component necessary for constituting a wave absorber which is to be applied to a non-reflecting object. For example, such an absorber containing the reflecting layer is applied to the wall of buildings in order to prevent radio interference. The reflecting layer is also further laminated to strengthen the wave absorber and facilitate it to be bonded to a material to which the wave layer is to be applied. Resins used in the production of the reflecting layer are of the same kind as those used in the surface layer. The thin metal plate or film used as the reflecting layer is made of, for example, aluminium or steel.

As mentioned above, this invention provides two types of wave absorbers, that is, a wave absorber having a "surface layer/wave absorbing layer" structure and a wave absorber having a "surface layer/wave absorbing layer/reflecting layer" structure. These wave absorbers will be briefly explained with reference to the accompanying drawings.

Figure 2:
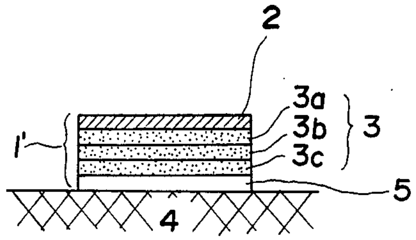
FIG. 2 is a sectional view of another wave absorber of this invention applied to a reflecting body.

FIG. 1 shows a wave absorber of this invention which has a "surface layer/wave absorbing layer" structure and has been applied to a reflecting body, and FIG. 2 shows a wave absorber of this invention which has a "surface layer/wave absorbing layer/reflecting layer" structure and has been applied to a reflecting body.

Referring to FIG. 1, a wave absorber 1 is composed of a surface layer 2 and a wave absorbing layer 3, and is bonded to a reflecting body 4. The wave absorbing layer 3 is prepared by laminating composites **3*a* to 3*c* each containing SiC fibers. It is preferable that the electric specific resistances of SiC fibers in the composites 3*a* to 3*c* be in the decreasing order from the outermost layer 3*a* towards the innermost layer 3*c* facing the reflecting body 4. Referring to FIG. 2, a wave absorber 1′ is composed of a surface layer 2, a wave absorbing layer 3 and a reflecting layer 5, and is applied to a reflecting body 4. In addition, the wave absorber 1′** may be applied to a material permeable to electromagnetic waves.

This invention will be better understood by the following Examples and Comparative Examples.

EXAMPLE 1 AND COMPARATIVE EXAMPLE 1

A surface layer (first layer) was prepared from a composite of an epoxy resin and a woven cloth (8-layer satin) made of SiC fibers having an electrical specific resistance of $6.0\times10^6$ Ωcm. A wave absorbing layer was prepared by laminating together a composite (second layer) of an epoxy resin and a woven cloth made of SiC fibers having an electrical specific resistance of $5.0\times10^3$ Ωcm and a composite (third layer) of an epoxy resin and a woven cloth made of SiC fibers having an electrical specific resistance of $3.0\times10^{0}$ Ωcm and an epoxy resin.

The first, second and third layers were laminated together in this order, formed into a predetermined shape and then cured to obtain a wave absorber having a size of 300 mm long, 300 mm wide and 4.0 mm thick (Example 1). In addition, the thickness of the surface layer and the whole absorbing layer (second and third) were 2.8 mm and 1.2 mm, respectively.

The thus obtained wave absorber was applied to a 0.2 mm thick aluminum film as a reflecting body and then measured for attenuation of a wave having a frequency of 8 to 16 GHz by reflection thereof by the wave absorberapplied aluminum film. The attenuation so measured was evaluated in comparison with the inherent attentuation (caused by reflection of the wave by the absorber-free original aluminum film). The result is as shown in FIG. 3.

Further, the procedure of Example 1 was followed except that the surface layer was not used (Comparative Example 1). The result is also as shown in FIG. 3.

Figure 3:
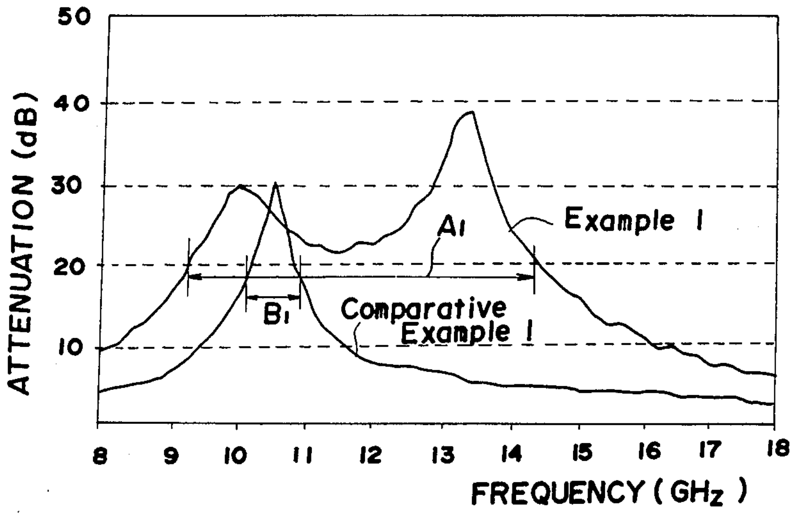
FIGS. 3, 5 and 6 are each a graph showing the relationship between the frequency of a wave applied to a wave absorber and the wave attenuation effected by the wave absorber in the following Examples and Comparative Examples.

As is seen from FIG. 3, the wave absorber of Example 1 consisting of the surface layer and the wave absorbing layer exhibited excellent absorbability as compared with that of Comparative Example 1 composed of the wave absorbing layer alone. More particularly, the electromagnetic wave absorbing frequency range ($A_1$) in which the former absorber exhibited an attenuation which was at least 20 dB higher than the inherent attenuation, was a wide one (i.e. 4.8 GHz), while that ($B_1$) in which the latter exhibited the same attentuation as the above, was a narrow one (i.e. 0.5 GHz). The term "an attentuation which is at least 20 dB higher than the inherent attenuation" is hereinafter referred to as "a 20 dB attentuation" for brevity.

In addition, test pieces were cut out of the wave absorber of Example 1 and then evaluated for mechanical properties. As a result of the test, it was found that the wave absorber of Example 1 had a tensile strength of 40 Kg/mm², tensile modulus of 7000 Kg/mm² and compression strength of 60 Kg/mm², this indicating sufficient strength and flexibility.

EXAMPLE 2 AND COMPARATIVE EXAMPLE 2

Figure 4:
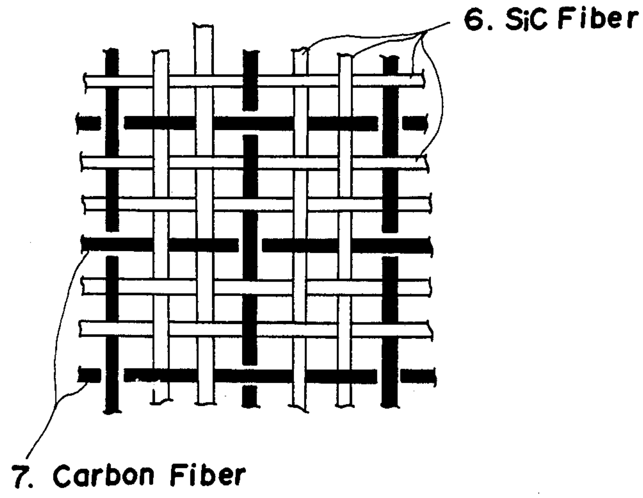
FIG. 4 shows the structure of a SiC fibers/carbon fibers mixed textile as used in the following Example 2.

A surface layer (first layer) was prepared from a composite of an epoxy resin and a woven cloth (8-layer satin) made of SiC fibers having an electrical specific resistance of $5.0\times10^{6}$ Ωcm. A wave absorbing layer was prepared by laminating together a composite (second layer) of an epoxy resin and a woven cloth made of SiC fibers having an electrical specific resistance of $5.0\times10^{3}$ Ωcm, and a composite (third layer) of an epoxy resin and a SiC fiber/carbon fiber mixed textile having an electrical specific resistance of $1.0\times10^{-1}$ Ωcm. The SiC fiber/carbon fiber mixed textile was prepared by interweaving SiC fibers (warp) 6 having an electrical specific resistance of $5.0\times10^{3}$ Ωcm with carbon fibers (woof) 7 in a ratio of 2:1 between the warps and wooves as indicated in FIG. 4.

The first, second and third layers were laminated together in this order, formed into a predetermined shape and then cured to obtain a wave absorber having a size of 300 mm length, 300 mm width and 4.5 mm thickness (Example 2). In addition, the thickness of the first, second and third layers were 3.0 mm, 0.7 mm and 0.8 mm, respectively.

The thus obtained wave absorber was applied to an aluminum film and then measured for attenuation in the same manner as in Example 1. The result is as shown in FIG. 5.

Further, the procedure of Example 2 was followed except that the three-layer wave absorber was substituted by a comparative wave absorber (thickness 4.5 mm) made only of the same composite of the epoxy resin and the SiC fiber/carbon fiber mixed textile as that used in the third layer in Example 2 (Comparative Example 2). The result is also as shown in FIG. 5.

Figure 5:
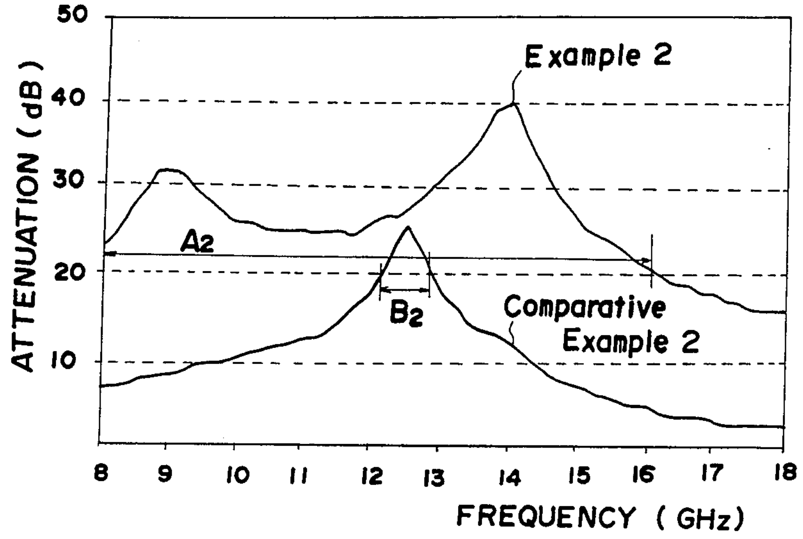

As is seen from FIG. 5, the electromagnetic wave absorbing frequency range ($A_2$) in which the wave absorber of Example 2 exhibited "a 20 dB" attenuation was as wide as 8 GHz, whereas that ($B_2$) in which the comparative wave absorber of Comparative Example 2 exhibited "a 20 dB" attenuation was undesirably as narrow as 0.8 GHz.

In addition, test pieces were cut out of the wave absorber of Example 2 and then evaluated for mechanical properties. As a result of the test, the wave absorber of Example 2 had a tensile strength of 50 Kg/mm², tensile modulus of 8000 Kg/mm² and compression strength of 70 Kg/mm², this indicating sufficient strength and flexibility.

EXAMPLE 3 AND COMPARATIVE EXAMPLE 3

The same composite as used in the surface layer in Example 2 was used to form a surface layer (first layer). A wave absorbing layer was prepared by laminating together the same composite (second layer) as used in the second layer in Example 2, and a composite (third layer) of a woven cloth made of SiC fibers having an electrical specific resistance of $5.0\times10^{2}$ Ωcm and an epoxy resin incorporated with 35% by weight of artificial graphite powders (325 mesh of finer).

These layers were laminated together, formed into a predetermined shape and then cured in the same manner as in Example 2 to obtain a wave absorber having a size of 300 mm long, 300 mm wide and 5.0 mm thick (Example 3). In addition, the thickness of the first, second and third layers were 3.0 mm, 0.8 mm and 1.2 mm, respectively.

The thus obtained wave absorber was applied to an aluminum film and then measured for attenuation in the same manner as in Example 1. The result is as shown in FIG. 6.

Further, the procedure of Example 3 was followed except that the same material of as used in the third layer of Example 3 was only used to form a wave absorber (5.0 mm thick) (Comparative Example 3). The attentuation results $A_3$ and $B_3$ are as shown in FIG. 6.

Figure 6:
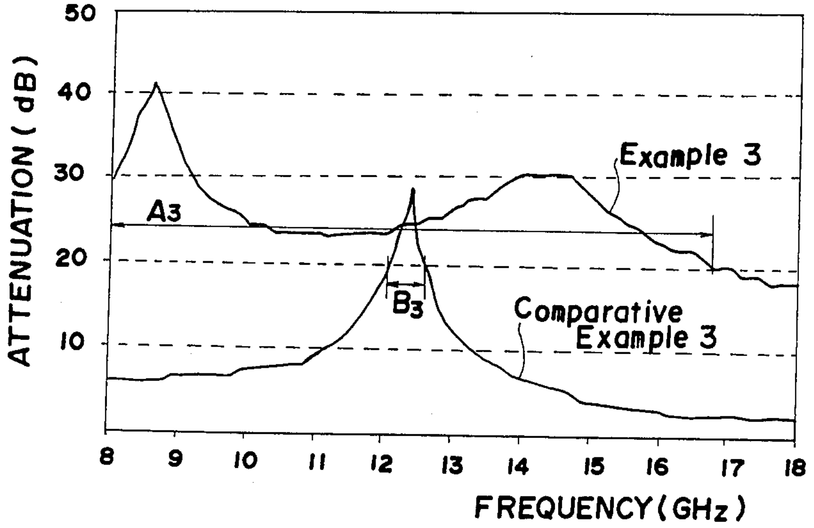

As is seen from FIG. 6, the wave absorber of Example 3 consisting of the surface layer and the wave absorbing layer exhibited excellent absorbability as compared with that of Comparative Example 3 composed of the wave absorbing layer alone. More particularly, the electromagnetic wave absorbing frequency range in which the former exhibited "a 20 dB" attenuation was as wide as 9 GHz, whereas that in which the latter exhibited "a 20 dB" attenuation was as narrow as 0.6 GHz.

In addition, test pieces were cut out of the wave absorber of Example 3 and then evaluated for mechanical properties. As a result of the test, the wave absorber of Example 3 had a tensile strength of 35 Kg/mm², tensile modulus of 6500 Kg/mm² and compression strength of 55 Kg/mm², this indicating sufficient strength and flexibility.

EFFECT OF THE INVENTION

As mentioned above, the electromagnetic wave absorbers of this invention give the following results or advantages:

(1) The wave absorbers of this invention have excellent attenuation ability and wave-absorbability in a wide range of frequency since the SiC fibers having low electrical specific resistance used in the absorbing layer are excellent in wave-absorbability. For example, waves having a frequency range of 8 to 12 GHz (X band) are usually used for radars. In this range, the wave absorbing frequency range in which the wave absorbers of this invention enhibit "a 20 dB" attenuation, is 3.5 GHz. In the case of a wave absorber in which a SiC fiber/carbon fiber mixed textile is used, it exhibits "a 20 dB" attenuation in a wave absorbing frequency range of at least 4 GHz.

(2) In cases where SiC fibers having high electrical specific resistance are used in the surface layer, the resulting absorber will be excellent in strength, flexibility and weatherproofness and is light in weight since the SiC fibers have such excellent properties.

(3) In cases where the surface and wave absorbing layers are made of the same materials, the resulting wave absorber will be difficultly degradable and have a structure of high strength.

(4) In cases where an inorganic material-containing resin is used in the wave absorbing layer, the resulting wave absorber will exhibit "a 20 dB" attenuation in a wave absorbing frequency range of at least 4 GHz.

What is claimed is:

1. An electromagnetic wave absorber comprising a surface layer made of a composite of fibers having an electrical specific resistance of more than $10^4$ Ωcm and a resin, and a wave absorbing layer made of at least one composite containing silicon carbide fibers having an electrical specific resistance of $10^{-2}$ to $10^4$ Ωcm.

2. An electromagnetic wave absorber according to claim 1, wherein the silicon carbide fibers used in the wave absorbing layer are prepared from an organic silicon compound.

3. An electromagnetic wave absorber according to claim 1, wherein the fibers used in the surface layer are silicon carbide fibers.

4. An electromagnetic wave absorber according to claim 1, wherein the wave absorbing layer is a multi-laminated layer.

5. An electromagnetic wave absorber according to claim 4, wherein the multi-laminated layer is prepared by laminating together the composites containing silicon carbide fibers having different electrical specific resistances in such a manner that the different electrical specific resistances of the laminated layers are decreasingly gradient in the direction from the outermost layer towards the innermost layer.

6. An electromagnetic wave absorber according to claim 1, wherein the composite used in the wave absorbing layer is in the form of a woven cloth or mat made of silicon carbide fibers and carbon fibers in a mixing ratio of 20:1 to 60:40 between the silicon carbide fibers and the carbon fibers, and the electrical specific resistance of the composite is in the range of $10^{-2}$ to $10^4$ Ωcm.

7. An electromagnetic wave absorber according to claim 1, wherein the composite used in the wave absorbing layer further comprises a resin containing inorganic material.

8. An electromagnetic wave absorber according to claim 7, wherein the inorganic material is carbon, titanium oxide or barium titanate.

9. An electromagnetic wave absorber according to claim 7, wherein the resin contains the inorganic material in an amount of 0.1 to 50.0% by weight of the resin.

10. An electromagnetic wave absorber according to claim 1, wherein the resins contained in the composites are thermosetting resins.

11. An electromagnetic wave absorber according to claim 10, wherein the thermosetting resins are epoxy type resins or phenol type resins.

12. An electromagnetic wave absorber according to claim 1, wherein the resins contained in the composites are thermoplastic resins.

13. An electromagnetic wave absorber according to claim 12, wherein the thermoplastic resin is polyester, polyphenylene sulfide, nylon, polyether sulfone or polyether ether ketone.

14. An electromagnetic wave absorber according to claim 1, wherein the wave absorbing layer is further laminated, at the far side with respect to the surface layer, with a composite made of carbon fibers, a resin and a thin metal plate.

15. An electromagnetic wave absorber according to claim 1, wherein the wave absorbing layer is further laminated, at the far side with respect to the surface layer, with a thin metal plate.

* * * * *